(12) United States Patent
Stryapunin et al.

(10) Patent No.: US 9,097,184 B2
(45) Date of Patent: Aug. 4, 2015

(54) GAS TURBINE SYSTEM HAVING PREMIXED INJECTOR VANES

(75) Inventors: Sergey Aleksandrovich Stryapunin, Moscow (RU); Kevin Weston McMahan, Greer, SC (US); Geoffrey David Myers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1179 days.

(21) Appl. No.: 12/981,451

(22) Filed: Dec. 29, 2010

(65) Prior Publication Data

US 2011/0314825 A1  Dec. 29, 2011

(51) Int. Cl.
*F02C 7/22* (2006.01)
*F02C 9/26* (2006.01)
*F23R 3/20* (2006.01)
*F23R 3/34* (2006.01)

(52) U.S. Cl.
CPC ... *F02C 7/22* (2013.01); *F02C 9/26* (2013.01); *F23R 3/20* (2013.01); *F23R 3/34* (2013.01); *F23R 2900/03341* (2013.01); *Y02T 50/67* (2013.01)

(58) Field of Classification Search
CPC .............. F02C 7/22; F23R 3/20; F23R 3/34; F23R 3/286; F23R 2900/003341
USPC ............... 60/39.17, 39.5, 733, 737, 740, 60/761–765, 748, 774, 777, 791
See application file for complete search history.

(56) References Cited

U.S. PATENT DOCUMENTS

| | | | |
|---|---|---|---|
| 4,438,625 A * | 3/1984 | Rice .............................. 60/39.17 |
| 5,577,378 A | 11/1996 | Althaus et al. |
| 5,617,718 A | 4/1997 | Althaus |
| 6,047,550 A | 4/2000 | Beebe |
| 6,192,688 B1 | 2/2001 | Beebe |
| 6,286,298 B1 * | 9/2001 | Burrus et al. ................... 60/737 |
| 6,311,471 B1 | 11/2001 | Waldherr et al. |
| 6,817,187 B2 | 11/2004 | Yu |
| 6,868,676 B1 * | 3/2005 | Haynes .......................... 60/776 |
| 2005/0229581 A1 * | 10/2005 | Bellucci et al. .............. 60/39.17 |
| 2007/0033945 A1 * | 2/2007 | Goldmeer et al. .............. 60/774 |

* cited by examiner

*Primary Examiner* — J. Gregory Pickett
(74) *Attorney, Agent, or Firm* — Fletcher Yoder P.C.

(57) ABSTRACT

In certain exemplary embodiments, a system includes an annular duct having an inner annular wall and an outer annular wall. The system also includes a plurality of injector vanes configured to mix air and fuel to produce an air-fuel mixture, and configured to inject the air-fuel mixture into a central chamber between the inner and outer annular walls.

21 Claims, 8 Drawing Sheets

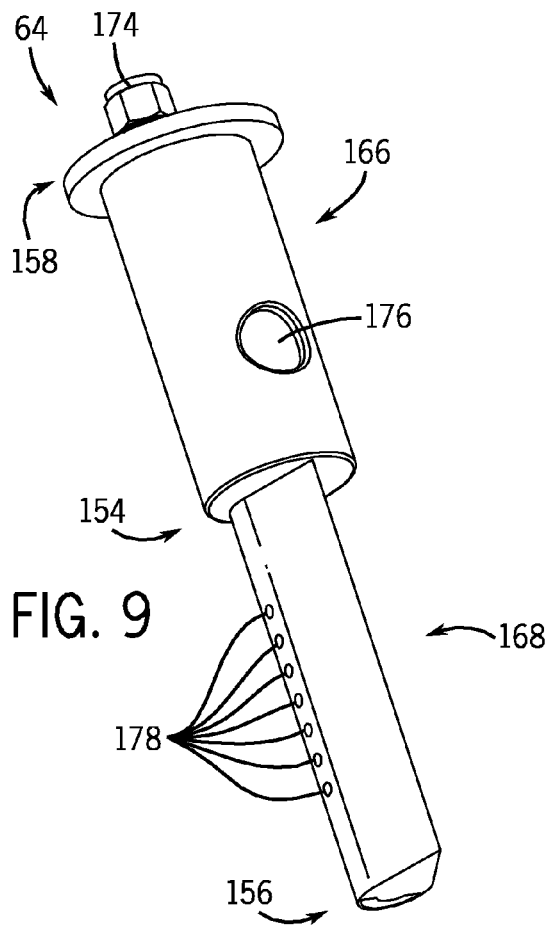
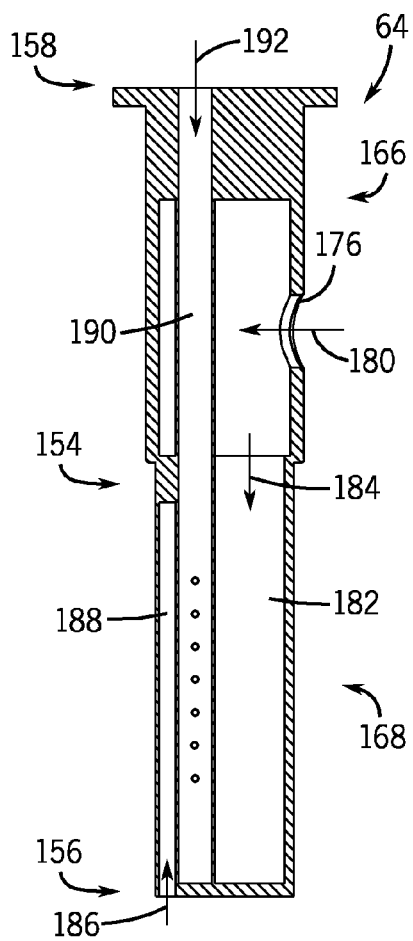
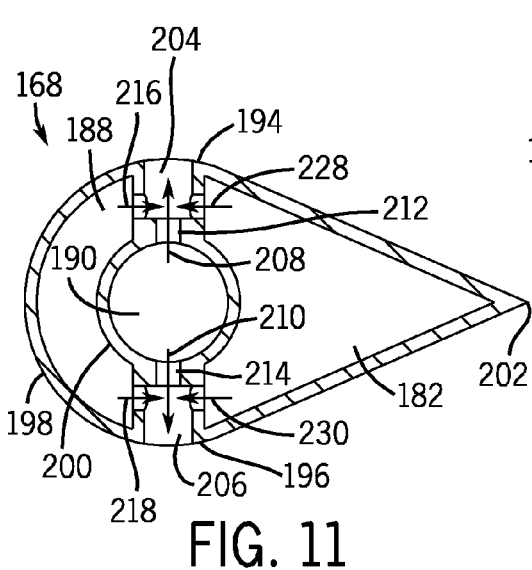
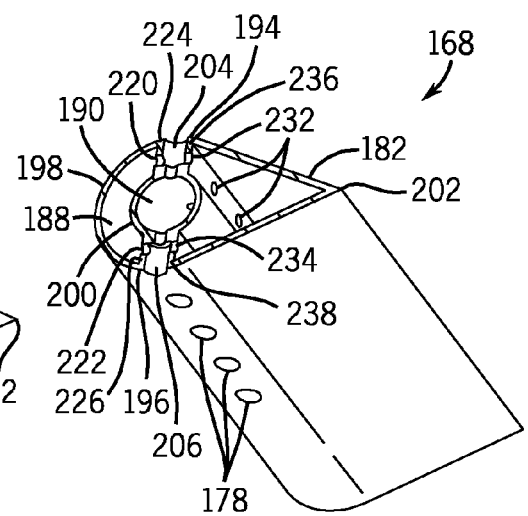

GAS TURBINE SYSTEM HAVING PREMIXED INJECTOR VANES

CROSS-REFERENCE TO RELATED APPLICATION

This application claims priority to and the benefit of Russian Patent Application No. 2010126341, entitled "GAS TURBINE SYSTEM HAVING PREMIXED INJECTOR VANES," filed Jun. 29, 2010, which is herein incorporated by reference in its entirety.

BACKGROUND OF THE INVENTION

The subject matter disclosed herein relates to gas turbines and, more specifically, to the reheating of gas turbine gases using an annular reheat combustion system with premixed injector vanes.

Gas turbine systems often have multiple turbine sections. For example, gases from one turbine section may be directed into subsequent turbine sections, with each turbine section contributing to the work performed by the gas turbine system. Unfortunately, as the gases move from one turbine section to the next, the pressure and temperature of the gases decrease as each turbine section extracts work from the flow, generally reducing the work output of each successive turbine section.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gas turbine system includes a compressor configured to receive and compress a working fluid. The gas turbine system also includes a combustor configured to receive compressed working fluid from the compressor and fuel. The combustor is configured to combust a mixture of the compressed working fluid and the fuel to generate an exhaust gas. The gas turbine system also includes a turbine having a first turbine section and a second turbine section. The turbine is configured to receive the exhaust gas from the combustor and to utilize the exhaust gas to rotate a shaft. An annular reheat combustion system is located between the first and second turbine sections. The annular reheat combustion system includes a premixed injector vane configured to mix air and fuel to produce an air-fuel mixture, and configured to inject the air-fuel mixture into the exhaust gas received from the first turbine section.

In a second embodiment, a system includes an annular reheat combustion system configured to mount between first and second turbine sections of a gas turbine system. The annular reheat combustion system includes an annular duct having an inner annular wall, an outer annular wall, and first and second interior walls between the inner annular wall and the outer annular wall. The annular reheat combustion system also includes a premixed injector vane configured to mix air and fuel to produce an air-fuel mixture, and configured to inject the air-fuel mixture into a stream of exhaust gases from the first turbine section.

In a third embodiment, a system includes an annular duct having an inner annular wall and an outer annular wall. The system also includes a plurality of injector vanes configured to mix air and fuel to produce an air-fuel mixture, and configured to inject the air-fuel mixture into a central chamber between the inner and outer annular walls.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 is a perspective view of an exemplary embodiment of the premixed injector vane;

FIG. 10 is a cutaway side view of an exemplary embodiment of the premixed injector vane, illustrating the flow of air and fuel through the premixed injector vane;

FIG. 11 is a cross-sectional view of an exemplary embodiment of the bottom section of the premixed injector vane, illustrating the flow of air and fuel through the bottom section of the premixed injector vane; and FIG. 12 is a perspective view of an exemplary embodiment of the bottom section of the premixed injector vane, illustrating the flow of air and fuel through the bottom section of the premixed injector vane.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for reheating gases between turbine sections of a gas turbine system. In particular, the embodiments described herein include an annular reheat combustion system having a plurality of premixed injector vanes. The premixed injector vanes are configured to premix air with fuel before injecting the air-fuel mixture into the stream of exhaust gases to create a reheat combustion that generates hot reheated gases, which may be directed into a downstream turbine section. Advantages of the disclosed embodiments include the fact that vortex generators and other such air/fuel mixing features, and discrete mixing ducts are not needed due at least in part to the premixing of the air and fuel before injection into the intersection gases. In addition, the quality of the mixing with the gases may be very high due at least in part to the high number (e.g., 20 or more) of injection holes per premixed injector vane, as well as the large number of vanes, equally distributed around the circumference. Furthermore, reheating the gases between sections as described herein may lead to gas turbine or gas turbine combined cycle thermal efficiency increases of approximately 1-3% or greater.

Figure 1:
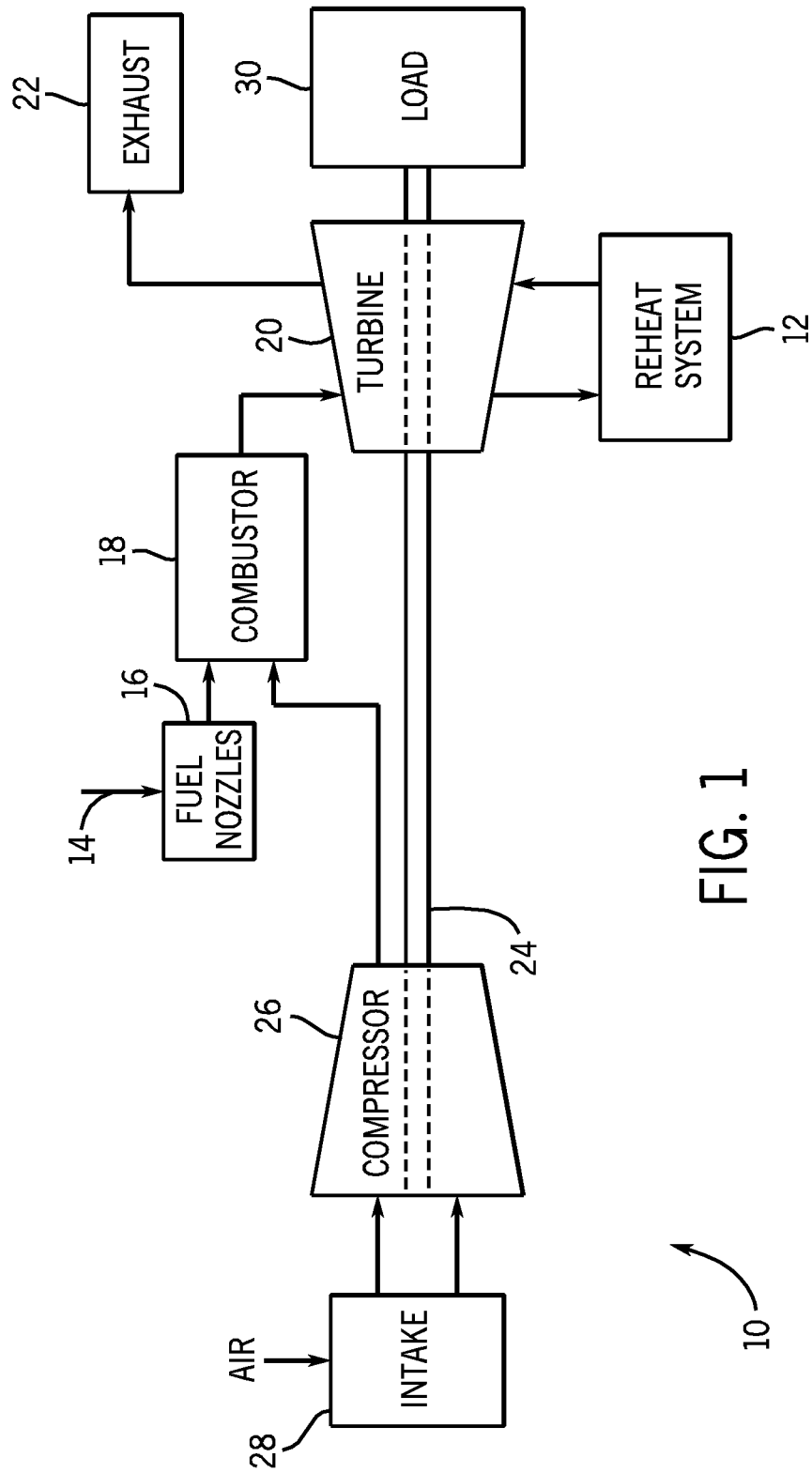
FIG. 1 is a schematic flow diagram of an exemplary embodiment of a gas turbine system having an annular reheat combustion system with premixed injector vanes.

FIG. 1 is a schematic flow diagram of an exemplary embodiment of a gas turbine system 10 having an annular reheat combustion system 12 with premixed injector vanes. As described in greater detail below, the annular reheat combustion system 12 may be configured to reheat gases between different turbine sections (e.g., upstream and downstream turbine stages) of the gas turbine system 10 using a plurality of premixed injector vanes, each having a plurality of injection holes for introducing a premixed air-fuel mixture into the stream of gases between the first and second turbine sections.

The gas turbine system 10 may use liquid or gas fuel 14, such as natural gas and/or a hydrogen rich synthetic gas. As depicted, a plurality of fuel nozzles 16 intakes the fuel supply 14, mixes the fuel with air, and distributes the air-fuel mixture into a combustor 18. For example, the fuel nozzles 16 may inject the air-fuel mixture into the combustor 18 in a suitable ratio for optimal combustion, emissions, fuel consumption, and power output. The air-fuel mixture combusts in a chamber within the combustor 18, thereby creating hot pressurized exhaust gases. The combustor 18 directs the exhaust gases through a turbine 20 toward an exhaust outlet 22. As the exhaust gases pass through the turbine 20, the gases force one or more turbine blades to rotate a shaft 24 along an axis of the gas turbine system 10. As illustrated, the shaft 24 may be connected to various components of the gas turbine system 10, including a compressor 26. The compressor 26 also includes blades that may be coupled to the shaft 24. As the shaft 24 rotates, the blades within the compressor 26 also rotate, thereby compressing air from an air intake 28 through the compressor 26 and into the fuel nozzles 16 and/or combustor 18. The shaft 24 may also be connected either mechanically or aerodynamically to a load 30, which may be a vehicle or a stationary load, such as an electrical generator in a power plant or a propeller on an aircraft, for example. The load 30 may include any suitable device capable of being powered by the rotational output of the gas turbine system 10.

Figure 2:
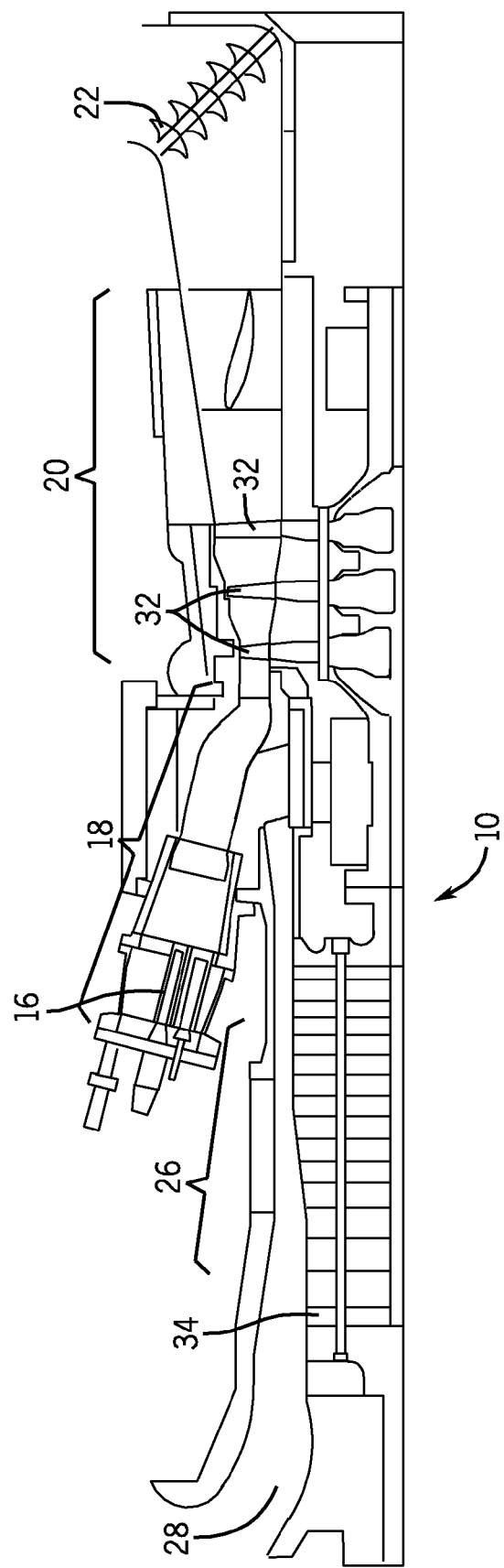
FIG. 2 is a cross-sectional side view of an exemplary embodiment of the gas turbine system having the annular reheat combustion system with premixed injector vanes, as illustrated in FIG. 1.

FIG. 2 is a cross-sectional side view of an exemplary embodiment of the gas turbine system 10 having the annular reheat combustion system 12 with premixed injector vanes, as illustrated in FIG. 1. The gas turbine system 10 includes one or more fuel nozzles 16 located inside one or more combustors 18. In operation, air enters the gas turbine system 10 through the air intake 28 and is pressurized in the compressor 26. The compressed air may then be mixed with gas for combustion within the combustor 18. For example, the fuel nozzles 16 may inject an air-fuel mixture into the combustor 18 in a suitable ratio for optimal combustion, emissions, fuel consumption, and power output. The combustion generates hot pressurized exhaust gases, which then drive one or more blades 32 within the turbine 20 to rotate the shaft 24 and, thus, the compressor 26 and the load 30. The rotation of the turbine blades 32 causes a rotation of the shaft 24, thereby causing blades 34 within the compressor 26 to draw in and pressurize the air received by the air intake 28. It should be noted that the gas turbine system 10 may be configured to work with suitable working fluids other than air, such as blends of carbon dioxide and oxygen.

Figure 3:
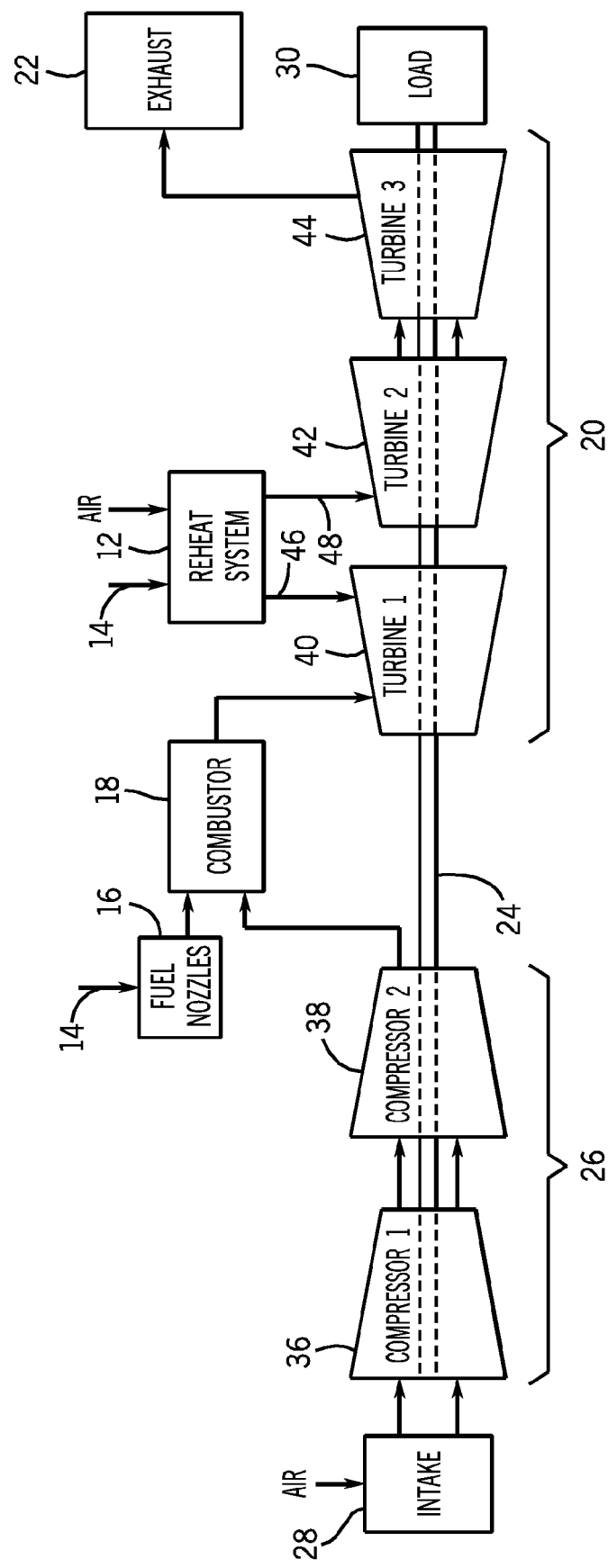
FIG. 3 is a schematic flow diagram of an exemplary embodiment of the gas turbine system having the annular reheat combustion system with premixed injector vanes and a plurality of compressor and turbine sections.

FIG. 3 is a schematic flow diagram of an exemplary embodiment of the gas turbine system 10 having the annular reheat combustion system 12 with premixed injector vanes and a plurality of compressor 26 and turbine 20 sections. In particular, the gas turbine system 10 illustrated in FIG. 3 includes two compressor sections 36, 38 and three turbine sections 40, 42, 44. In certain embodiments, the first compressor section 36 may be a low-pressure compressor section, such as a booster, whereas the second compressor section 38 may be an intermediate-pressure or high-pressure compressor section. In addition, in certain embodiments, the first turbine section 40 may be a high-pressure turbine section, the second turbine section 42 may be an intermediate-pressure turbine section, and the third turbine section 44 may be a power turbine section. However, in other embodiments, the plurality of compressor sections 36, 38 and turbine sections 40, 42, 44 may include other combinations of compressors and turbines. For example, the disclosed embodiments may be applied to single shaft or multi-shaft gas turbines.

In certain embodiments, air from the air intake 28 may be compressed within the first compressor section 36 to generate heated compressed air. Compressed air from the first compressor section 36 may be directed into the second compressor section 38, where the compressed air may be further compressed to generate the compressed air that is mixed with the fuel 14 within the combustor 18 of the gas turbine system 10.

As described above, the combustion in the combustor 18 generates hot pressurized exhaust gases, which then drive one or more blades 32 within the turbine 20 to rotate the shaft 24 and, thus, the compressor 26 and the load 30. In particular, in certain embodiments, the hot pressurized gases from the combustor 18 may first be directed into the first turbine section 40 (e.g., a high-pressure turbine section). After the hot pressurized gases from the combustor 18 have been used to drive blades within the first turbine section 40 to rotate the shaft 24, the exhaust gases 46 from the first turbine section 40 may be directed into the annular reheat combustion system 12. Within the annular reheat combustion system 12, the exhaust gases 46 from the first turbine section 40 may be reheated by combusting the exhaust gases 46 with air and fuel 14 to increase the temperature and pressure of the exhaust gases 46 to produce reheated pressurized gases 48, which may be directed into the second turbine section 42 (e.g., an intermediate-pressure turbine section) where the reheated pressurized gases 48 may be used to drive blades within the second turbine section 42 to rotate the shaft 24.

In other words, instead of moving directly from the first turbine section 40 to the second turbine section 42, the exhaust gases 46 from the first turbine section 40 are instead reheated within the annular reheat combustion system 12 and then directed into the second turbine section 42 as the reheated pressurized gases 48. From a thermodynamic standpoint, using the annular reheat combustion system 12 to reheat the exhaust gases 46 enables operation at a higher pressure ratio than using a single combustion system (i.e., without reheating). Reheating the exhaust gases 46 in the annular reheat combustion system 12 increases the amount of work output of the turbine 20. In certain embodiments, this may be accomplished without increasing the amount of compression required by the compressor 26 or increasing the temperature of the hot pressurized gases from the combustor 18 into the first turbine section 40. However, an optimum (e.g., most efficient) reheat cycle may utilize more compression from the compressor 26. One advantage of using the annular reheat combustion system 12 for reheating the exhaust gases 46 is power density. In other words, more output may be produced per unit size or volume than similarly sized systems that do not use reheating. As such, the gas turbine system 10 using the annular reheat combustion system 12 may be less expensive and more efficient at lower firing (e.g., turbine rotor inlet) temperatures.

In certain embodiments, due at least in part to the reheat combustion, the temperature of the hot pressurized gases from the combustor 18 may be maintained below design temperatures for the materials used in the first turbine section 40. In turn, the temperature of the exhaust gases 46 from the first turbine section 40 are increased upstream of the second turbine section 42. However, in other embodiments, an optimum reheat cycle might use the same firing temperature in each successive turbine stage. This is sometimes referred to as a "constant temperature turbine" approach. In certain embodiments, reheating the exhaust gases 46 from the first turbine section 40 to produce the reheated pressurized gases 48 directed into the second turbine section 42 may increase the thermal efficiency of the gas turbine system 10 by approximately 1-3% or greater.

As described above, the annular reheat combustion system 12 may be located between the first turbine section 40 and the second turbine section 42. In particular, the annular reheat combustion system 12 may include one or more converging-diverging annular ducts disposed around the shaft 24 of the gas turbine system 10. For example, in certain embodiments, the annular reheat combustion system 12 may include a single converging-diverging annular duct that forms the annular reheat combustion system 12. However, in other embodiments, the annular reheat combustion system 12 may include two or more converging-diverging annular ducts connected together to form the annular reheat combustion system 12.

Figure 4:
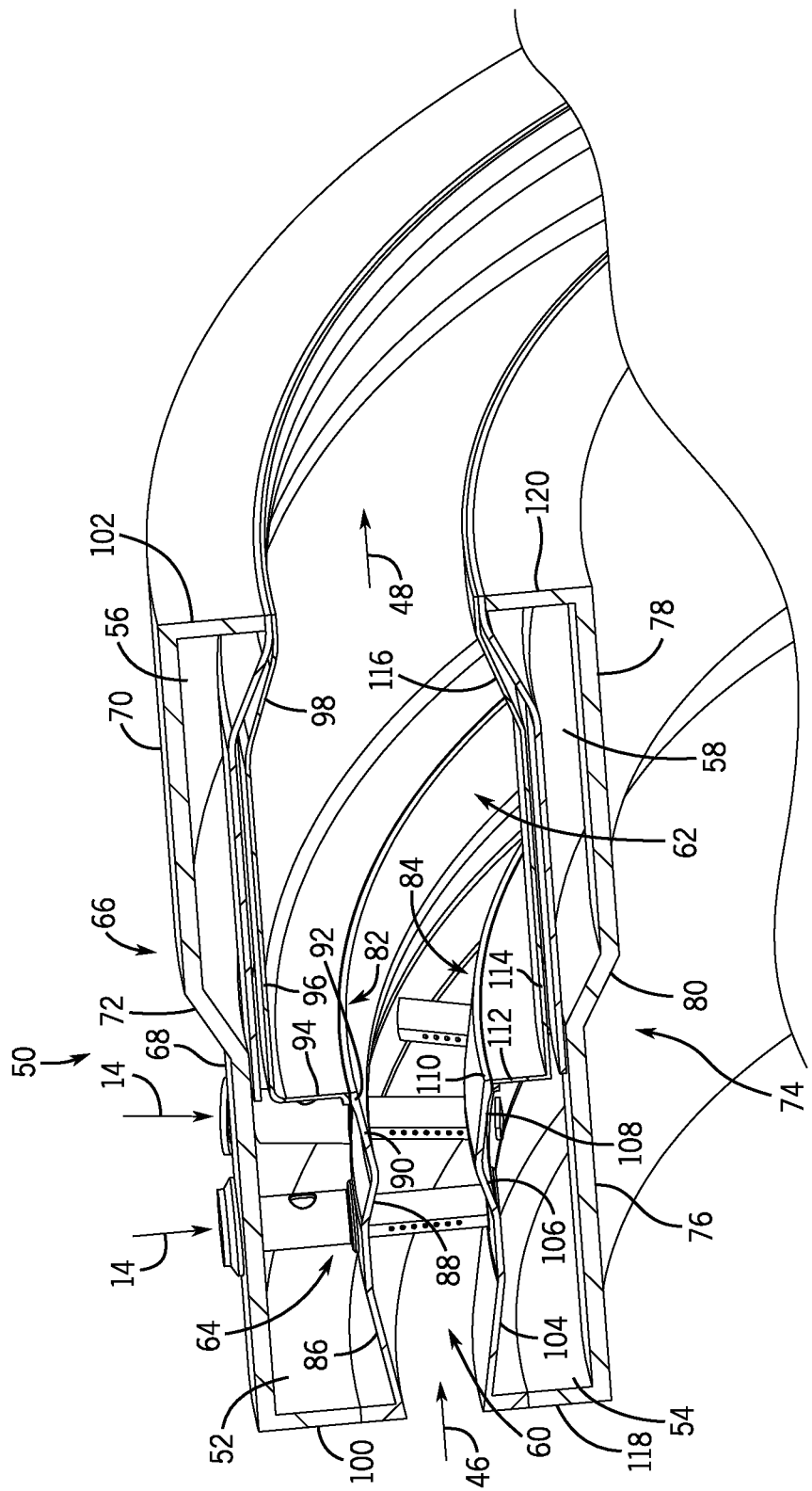
FIG. 4 is a partial cutaway perspective view of an exemplary embodiment of a converging-diverging annular duct and convectively cooled annular reheat combustion chamber used in the annular reheat combustion system with premixed injector vanes.

FIG. 4 is a partial cutaway perspective view of an exemplary embodiment of a converging-diverging annular duct 50 used in the annular reheat combustion system 12 with premixed injector vanes. As illustrated, the converging-diverging annular duct 50 includes an outer upstream air enclosure 52, an inner upstream air enclosure 54, an outer downstream air enclosure 56, and an inner downstream air enclosure 58 for circulating air through the converging-diverging annular duct 50. The outer upstream air enclosure 52, inner upstream air enclosure 54, outer downstream air enclosure 56, and inner downstream air enclosure 58 may all be hollow annular enclosures. In addition, the converging-diverging annular duct 50 includes an upstream reheat combustion chamber 60 and a downstream reheat combustion chamber 62, through which the exhaust gases 46 from the first turbine section 40 flow and are reheated to produce the reheated pressurized gases 48 that are directed into the second turbine section 42. As described in greater detail below, each converging-diverging annular duct 50 also includes one or more premixed injector vanes 64, which premix fuel 14 with air from the outer and inner upstream air enclosures 52, 54. The premixed air-fuel mixture is then injected into the upstream reheat combustion chamber 60, where it is combusted with the exhaust gases 46 from the first turbine section 40 to produce the reheated pressurized gases 48 that are directed into the second turbine section 42. In particular, the annular reheat combustion system 12 utilizes a self-ignition effect. In order to achieve reliable spontaneous ignition with the air-fuel mixture and to widen the stability range, the temperature of the exhaust gases 46 from the first turbine section 40 may be maintained above approximately 1100° F., which generally corresponds to the auto-ignition temperature for methane.

As illustrated, in certain embodiments, the converging-diverging annular duct 50 may include an outer wall 66 that includes an outer upstream wall section 68 and an outer downstream wall section 70 connected by a diverging wall section 72. In addition, in certain embodiments, the converging-diverging annular duct 50 may include an inner wall 74 that includes an inner upstream wall section 76 and an inner downstream wall section 78 connected by a diverging wall section 80. The converging-diverging annular duct 50 may also include an outer interior wall 82 and an inner interior wall 84 between the outer wall 66 and the inner wall 74.

The outer interior wall 82 may include a first diverging wall section 86 that diverges toward the outer wall 66. The first diverging wall section 86 may be connected to a first converging wall section 88 that converges away from the outer wall 66. The first converging wall section 88 may be connected to a second diverging wall section 90 that diverges toward the outer wall 66. A downstream end 92 of the second diverging wall section 90 may be connected to a connecting wall section 94 that extends radially from the second diverging wall section 90 toward the outer upstream wall section 68 of the outer wall 66. The connecting wall section 94 may be connected to a first downstream wall section 96 that extends generally parallel to the outer downstream wall section 70 of the outer wall 66. The first downstream wall section 96 may be connected to a second downstream wall section 98 that converges away from the outer downstream wall section 70 of the outer wall 66. In addition, the outer interior wall 82 may be connected to the outer upstream wall section 68 of the outer wall 66 by an upstream wall 100 that extends radially from the outer interior wall 82 to the outer upstream wall section 68. Similarly, the outer interior wall 82 may be connected to the outer downstream wall section 70 of the outer wall 66 by a downstream wall 102 that extends radially from the outer interior wall 82 to the outer downstream wall section 70.

The inner interior wall 84 may include a first diverging wall section 104 that diverges toward the inner wall 74. The first diverging wall section 104 may be connected to a first converging wall section 106 that converges away from the inner wall 74. The first converging wall section 106 may be connected to a second diverging wall section 108 that diverges toward the inner wall 74. A downstream end 110 of the second diverging wall section 108 may be connected to a connecting wall section 112 that extends radially from the second diverging wall section 108 toward the inner upstream wall section 76 of the inner wall 74. The connecting wall section 112 may be connected to a first downstream wall section 114 that extends generally parallel to the inner downstream wall section 78 of the inner wall 74. The first downstream wall section 114 may be connected to a second downstream wall section 116 that converges away from the inner downstream wall section 78 of the inner wall 74. In addition, the inner interior wall 84 may be connected to the inner upstream wall section 76 of the inner wall 74 by an upstream wall 118 that extends radially from the inner interior wall 84 to the inner upstream wall section 76. Similarly, the inner interior wall 84 may be connected to the inner downstream wall section 78 of the inner wall 74 by a downstream wall 120 that extends radially from the inner interior wall 84 to the inner downstream wall section 78.

The outer upstream air enclosure 52 is generally defined by the outer upstream wall section 68 of the outer wall 66, the first diverging wall section 86 of the outer interior wall 82, the first converging wall section 88 of the outer interior wall 82, the second diverging wall section 90 of the outer interior wall 82, the connecting wall section 94 of the outer interior wall 82, and the upstream wall 100. Similarly, the inner upstream air enclosure 54 is generally defined by the inner upstream wall section 76 of the inner wall 74, the first diverging wall section 104 of the inner interior wall 84, the first converging wall section 106 of the inner interior wall 84, the second diverging wall section 108 of the inner interior wall 84, the connecting wall section 112 of the inner interior wall 84, and the upstream wall 118. Furthermore, the upstream reheat combustion chamber 60 is generally defined by the first diverging wall section 86 of the outer interior wall 82, the first converging wall section 88 of the outer interior wall 82, the second diverging wall section 90 of the outer interior wall 82, the first diverging wall section 104 of the inner interior wall 84, the first converging wall section 106 of the inner interior wall 84, and the second diverging wall section 108 of the inner interior wall 84.

The outer downstream air enclosure 56 is generally defined by the diverging wall section 72 of the outer wall 66, the outer downstream wall section 70 of the outer wall 66, the first downstream wall section 96 of the outer interior wall 82, the second downstream wall section 98 of the outer interior wall 82, and the downstream wall 102. Similarly, the inner downstream air enclosure 58 is generally defined by the diverging wall section 80 of the inner wall 74, the inner downstream wall section 78 of the inner wall 74, the first downstream wall section 114 of the inner interior wall 84, the second downstream wall section 116 of the inner interior wall 84, and the downstream wall 120. Furthermore, the downstream reheat combustion chamber 62 is generally defined by the connecting wall section 94 of the outer interior wall 82, the first downstream wall section 96 of the outer interior wall 82, the second downstream wall section 98 of the outer interior wall 82, the connecting wall section 112 of the inner interior wall 84, the first downstream wall section 114 of the inner interior wall 84, and the second downstream wall section 116 of the inner interior wall 84.

It should be noted that an objective of the converging-diverging flowpath of the converging-diverging annular duct 50 is to help premix the fuel and air, and also to ensure an "area ruled" flow path, such that the flowpath blockage created by the premixed injector vanes 64 is accommodated by an increase in the duct cross-sectional area. Since the air-fuel mixture will auto-ignite readily within milliseconds at the temperatures in the converging-diverging annular duct 50, re-circulation zones, stagnation zones, weak, thick separated boundary layers, or other low-velocity regions in the mixing duct downstream of the fuel injection point should be minimized. The shape of the converging-diverging flowpath is intended to ensure that such regions are minimized. Flashback of the flame into the ducts, where it might hold onto the premixed injector vanes 64, would otherwise impact durability and NOx emissions. The region of rapid expansion, where the smaller converging-diverging duct (i.e., the upstream reheat combustion chamber 60) empties into the larger annular downstream reheat combustion chamber 62 is intended to stabilize the premixed flame. Another advantage of the flowpath shape is the reduction of the blockage in the intra-turbine flowpath. This type of blockage may otherwise create a higher pressure loss, reducing the pressure of the reheated pressurized gases entering the next section of the turbine, and reducing output and efficiency as well. Therefore, an objective of the converging-diverging duct (i.e., the upstream reheat combustion chamber 60) and the premixed injector vanes 64 is to efficiently and thoroughly mix the fuel and air for low NOx emissions, with a minimum amount of blockage and pressure loss, while also avoiding any stagnation zones that might lead to flashback and flameholding in parts of the converging-diverging annular duct 50 that are not designed for flame temperatures.

Figure 5:
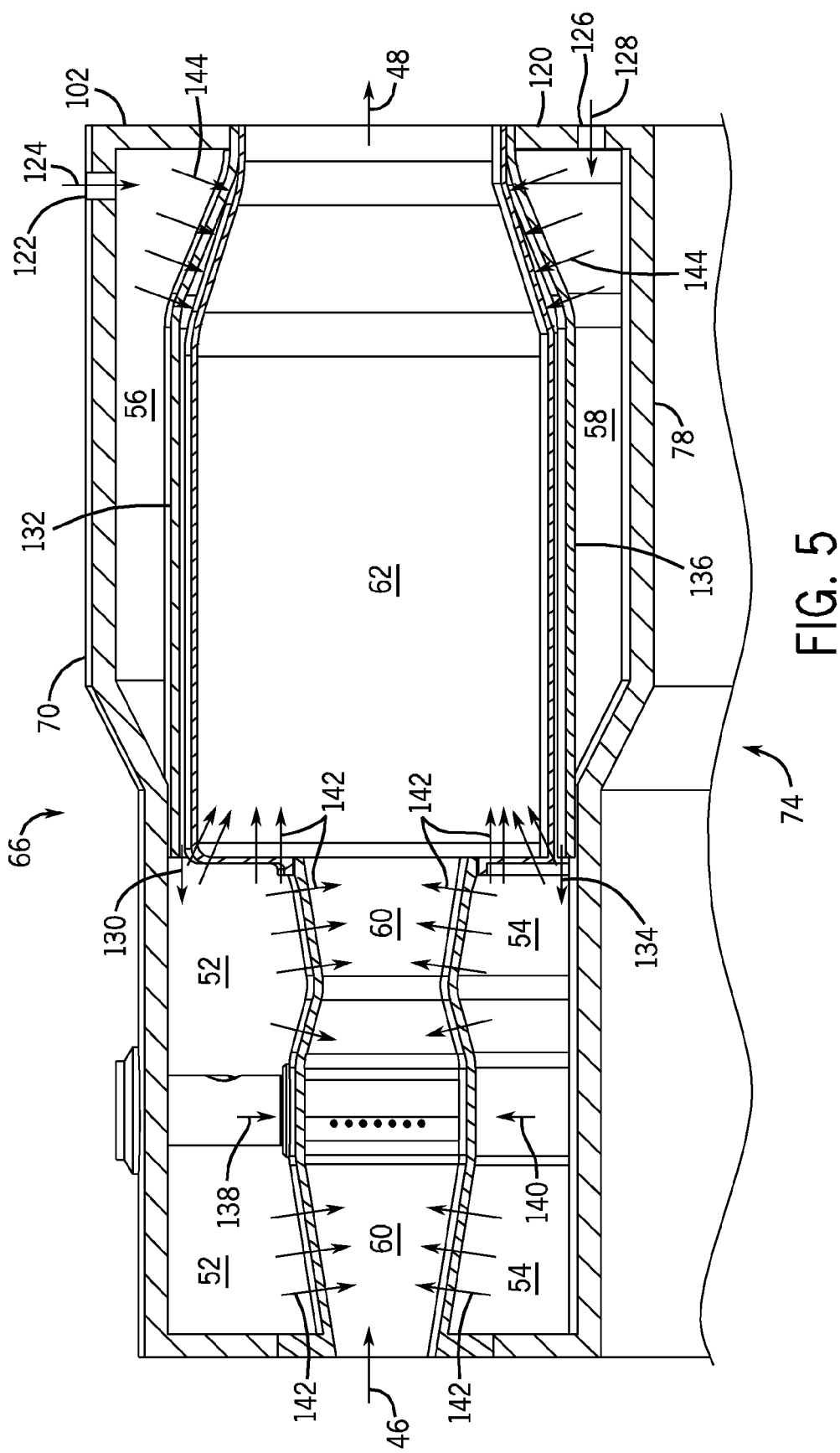
FIG. 5 is a cross-sectional side view of the converging-diverging annular duct and convectively cooled annular reheat combustion chamber.

FIG. 5 is a cross-sectional side view of the converging-diverging annular duct 50. In the embodiment illustrated in FIG. 5, air may enter the outer downstream air enclosure 56 through an outer air inlet 122, as illustrated by arrow 124. In the illustrated embodiment, the outer air inlet 122 may be located at a downstream end of the outer downstream wall section 70 of the outer wall 66. However, in other embodiments, the outer air inlet 122 may be located in the downstream wall 102. Similarly, in the embodiment illustrated in FIG. 5, air may enter the inner downstream air enclosure 58 through an inner air inlet 126, as illustrated by arrow 128. In the illustrated embodiment, the inner air inlet 126 may be located in the downstream wall 120. However, in other embodiments, the inner air inlet 126 may be located at a downstream end of the inner downstream wall section 78 of the inner wall 74. In certain embodiments, air entering the inner air inlet 126 may be bypassed across the hot flow path using one or more of the stator blades of the turbine 20. This bypass method also provides internal convective cooling to the stator vane, an added benefit.

As illustrated in FIG. 5, the air in the outer downstream air enclosure 56 flows into the outer upstream air enclosure 52, as illustrated by arrow 130. In certain embodiments, the air from the outer downstream air enclosure 56 may flow around and/or through an outer air enclosure divider 132, which extends through the outer downstream air enclosure 56 from the downstream wall 102 to the outer upstream wall section 68 of the outer wall 66. In particular, the outer air enclosure divider 132 may generally run parallel to the second downstream wall section 98 and the first downstream wall section 96 of the outer interior wall 82. Similarly, the air in the inner downstream air enclosure 58 flows into the inner upstream air enclosure 54, as illustrated by arrow 134. In certain embodiments, the air from the inner downstream air enclosure 58 may flow around and/or through an inner air enclosure divider 136, which extends through the inner downstream air enclosure 58 from the downstream wall 120 to the inner upstream wall section 76 of the inner wall 74. In particular, the inner air enclosure divider 136 may generally run parallel to the second downstream wall section 116 and the first downstream wall section 114 of the inner interior wall 84. A benefit of the air enclosure dividers 132, 136 is the ability to tailor the flow area around the outside of the downstream reheat combustion chamber 62 so that the external convection cooling of the downstream reheat combustion chamber 62 is enhanced. The air enclosure dividers 132, 136 may be referred to as "flow sleeves" or "heat shields."

Also, as illustrated in FIG. 5, some of the air in the outer upstream air enclosure 52 may flow into the premixed injector vanes 64, as illustrated by arrow 138. Similarly, some of the air in the inner upstream air enclosure 54 may flow into the premixed injector vanes 64, as illustrated by arrow 140. As described in greater detail below, the air that flows into the premixed injector vanes 64 may be premixed with fuel 14 before being injected into the stream of exhaust gases 46 in the upstream reheat combustion chamber 60, where the air-fuel mixture is combusted to produce the reheated pressurized gases 48 that are directed into the second turbine section 42. Premixing the air-fuel mixture before injecting it into the stream of exhaust gases 46 in the upstream reheat combustion chamber 60 reduces the need for vortex generators and other downstream mixing equipment. In addition, premixing the air-fuel mixture allows for a greater degree of control of the air-fuel mixture.

In addition, the air in the outer upstream air enclosure 52 and the inner upstream air enclosure 54 may cool the walls of the upstream reheat combustion chamber 60 and the downstream reheat combustion chamber 62 through effusion cooling through the outer interior wall 82 and the inner interior wall 84, as illustrated by arrows 142. Similarly, the air in the outer downstream air enclosure 56 and the inner downstream air enclosure 58 may cool the walls of the downstream reheat combustion chamber 62 through impingement cooling, as illustrated by arrows 144.

More specifically, the air flows shown in FIG. 5 are supplied by the compressor 26 of the gas turbine system 10 at compressor discharge temperatures. The air enclosures 52, 54, 56, 58 make use of the compressor air that will eventually be injected in through the premixed injector vanes 64. In particular, the compressor air is used for convective impingement cooling at the aft section of the annular downstream reheat combustion chamber 62, as illustrated by arrows 144, and also for effusion cooling (e.g., a type of film cooling) elsewhere, as illustrated by arrows 142. The inner surfaces of the downstream reheat combustion chamber 62 may be coated with a ceramic, insulating "thermal barrier coating" to further enhance the effectiveness of the external convective cooling. These types of highly efficient cooling enable a dry, low-emissions reheat combustor. One of the challenges of conventional reheat techniques is how to efficiently use available cooling air, since the amount of surface area to be cooled increases with a second (e.g., the reheat) combustion system. However, the film, enhanced convection, impingement, and effusion cooling techniques illustrated in FIG. 5 may lead to enhanced cooling using the annular reheat combustion system 12.

Figure 6:
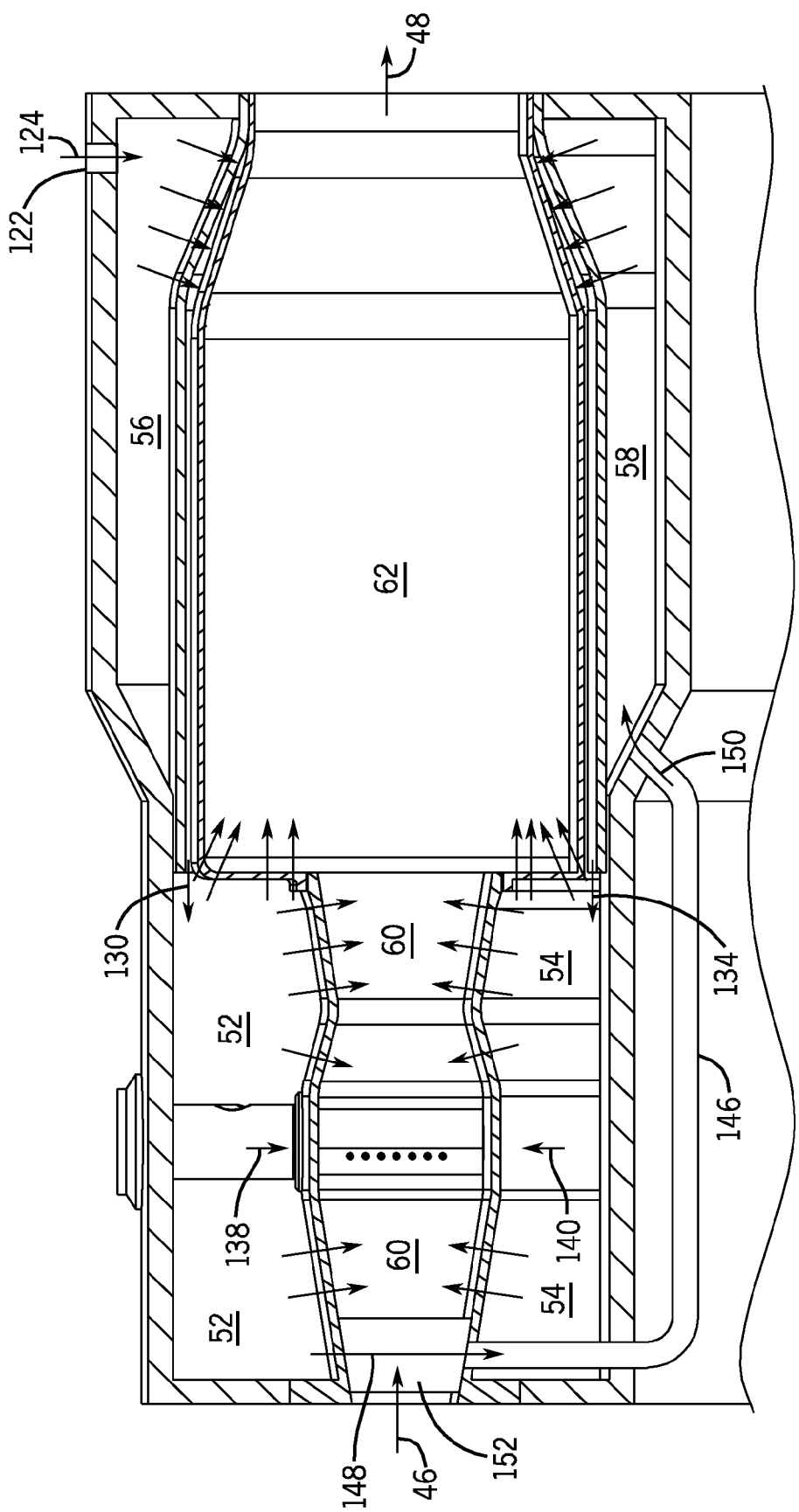
FIG. 6 is another cross-sectional side view of the converging-diverging annular duct and convectively cooled annular reheat combustion chamber.

FIG. 6 is another cross-sectional side view of the converging-diverging annular duct 50. In the embodiment illustrated in FIG. 6, air only enters the outer downstream air enclosure 56 through the outer air inlet 122, as illustrated by arrow 124. In other words, air does not enter the inner downstream air enclosure 58 through the inner air inlet 126. Similar to the embodiment illustrated in FIG. 5, the air in the outer downstream air enclosure 56 flows into the outer upstream air enclosure 52, as illustrated by arrow 130. In addition, similar to the embodiment illustrated in FIG. 5, some of the air in the outer upstream air enclosure 52 flows into the premixed injector vanes 64, as illustrated by arrow 138.

However, in the embodiment illustrated in FIG. 6, some of the air in the outer upstream air enclosure 52 may flow from the outer upstream air enclosure 52 to the inner downstream air enclosure 58 through a conduit 146 that extends from the outer upstream air enclosure 52 through the inner upstream air enclosure 54 and into the inner downstream air enclosure 58, as illustrated by arrows 148 and 150. The conduit 146 may extend through a hollow guide vane 152 that extends from the outer interior wall 82 to the inner interior wall 84. The guide vane 152 may guide the exhaust gases 46 from the first turbine section 40 across the premixed injector vanes 64. Similar to the embodiment illustrated in FIG. 5, the air in the inner downstream air enclosure 58 flows into the inner upstream air enclosure 54, as illustrated by arrow 134. In addition, similar to the embodiment illustrated in FIG. 5, some of the air in the inner upstream air enclosure 54 may flow into the premixed injector vanes 64, as illustrated by arrow 140.

Figure 7:
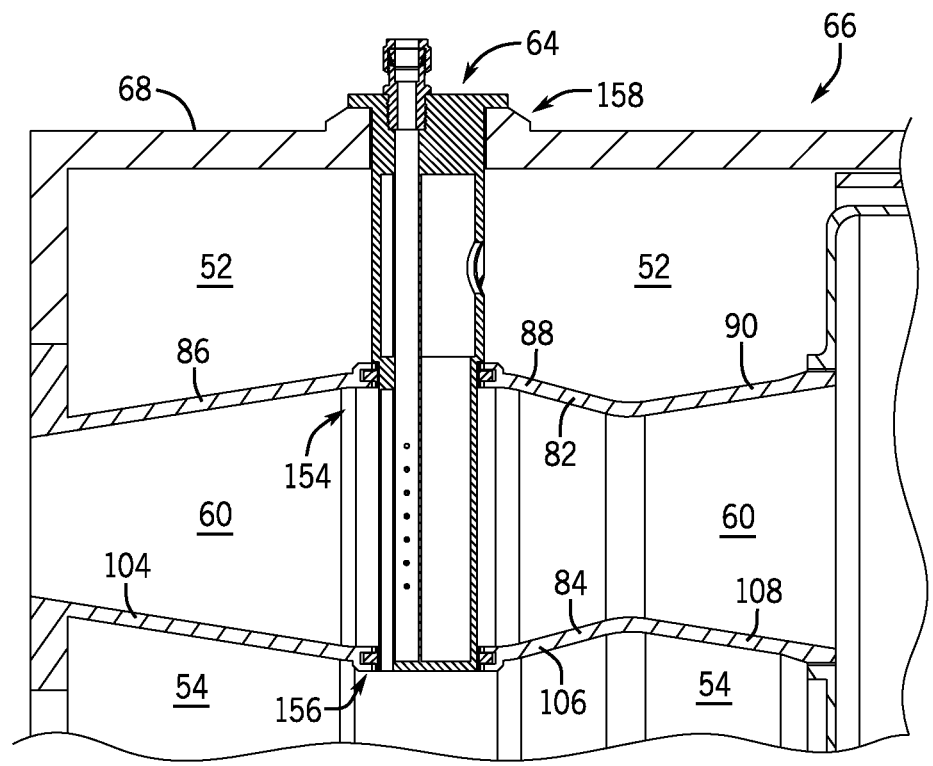
FIG. 7 is a partial cutaway side view of an exemplary embodiment of the converging-diverging annular duct, illustrating a mounting arrangement of the premixed injector vanes within the converging-diverging annular duct.

FIG. 7 is a partial cutaway side view of an exemplary embodiment of the converging-diverging annular duct 50, illustrating a mounting arrangement of the premixed injector vanes 64 within the converging-diverging annular duct 50. As illustrated in FIG. 7, each premixed injector vane 64 is mounted in place within its respective converging-diverging annular duct 50 between the outer upstream wall section 68 of the outer wall 66, the outer interior wall 82, and the inner interior wall 84. In particular, a middle cross-section 154 of the premixed injector vane 64 is secured between the first diverging wall section 86 and the first converging wall section 88 of the outer interior wall 82. Similarly, a distal cross-section 156 of the premixed injector vane 64 is secured between the first diverging wall section 104 and the first converging wall section 106 of the inner interior wall 84. In addition, a proximal cross-section 158 of the premixed injector vane 64 is secured between the outer upstream wall section 68 of the outer wall 66. In other words, instead of being cantilevered inside of the outer wall 66, the premixed injector vane 64 is held securely in place at three locations along the premixed injector vane 64. As such, the premixed injector vane 64 is more stable with respect to the stream of exhaust gases 46 in the upstream reheat combustion chamber 60. However, in other embodiments, the premixed injector vanes 64 may not be held in place by the outer interior wall 82 and the inner interior wall 84. Indeed, in such embodiments, no outer and inner interior walls 82, 84 may be used at all. Rather, the premixed injector vanes 64 may be mounted to an outer casing. In addition, in certain embodiments, the premixed injector vanes 64 may not all be the same length.

Figure 8:
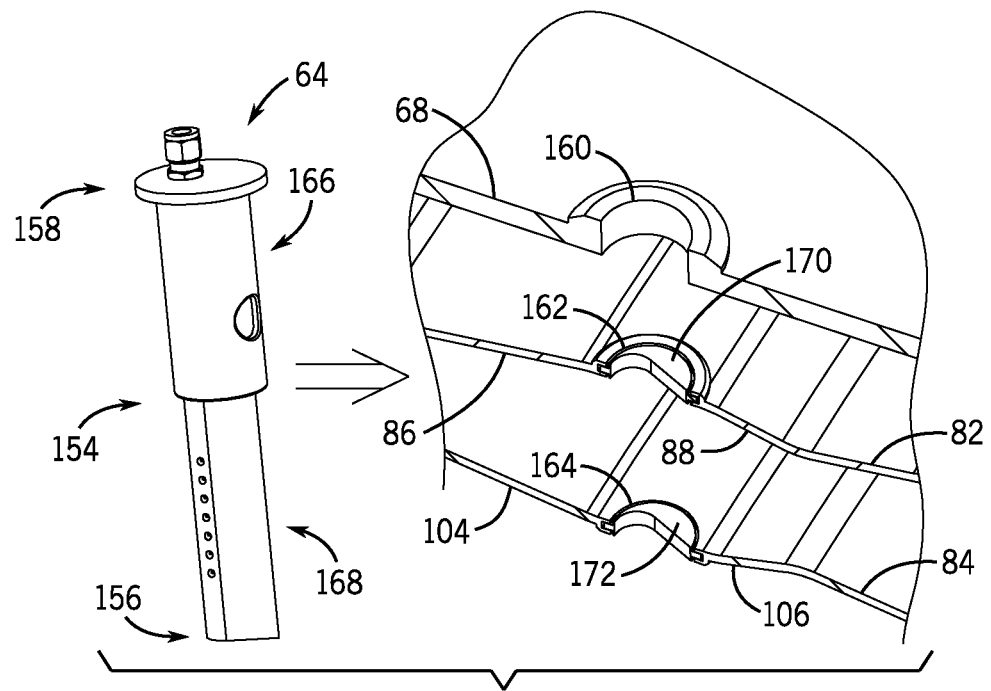
FIG. 8 is a partial perspective cutaway view of the premixed injector vane and the converging-diverging annular duct, illustrating mounting features to hold the premixed injector vane in place within the converging-diverging annular duct.

FIG. 8 is a partial perspective cutaway view of the premixed injector vane 64 and the converging-diverging annular duct 50, illustrating mounting features to hold the premixed injector vane 64 in place within the converging-diverging annular duct 50. As illustrated, the outer upstream wall section 68 of the outer wall 66, the outer interior wall 82, and the inner interior wall 84 each include mounting holes, within which the premixed injector vane 64 is mounted. More specifically, the outer upstream wall section 68 of the outer wall 66 includes a mounting hole 160, which holds the proximal cross-section 158 of the premixed injector vane 64 in place. Similarly, the outer interior wall 82 includes a mounting hole 162 generally located between the first diverging wall section 86 and the first converging wall section 88 of the outer interior wall 82. The mounting hole 162 in the outer interior wall 82 holds the middle cross-section 154 of the premixed injector vane 64 in place. In addition, the inner interior wall 84 includes a mounting hole 164 generally located between the first diverging wall section 104 and the first converging wall section 106 of the inner interior wall 84. The mounting hole 164 in the inner interior wall 84 holds the distal cross-section 156 of the premixed injector vane 64 in place.

As illustrated in FIG. 8, the premixed injector vane 64 generally includes two distinct sections. In particular, the premixed injector vane 64 includes a generally circular top section 166 between the proximal cross-section 158 and the middle cross-section 154, and a generally airfoil-shaped bottom section 168 between the middle cross-section 154 and the distal cross-section 156. Although illustrated as being airfoil-shaped, the bottom section 168 may be of any shape that minimizes aerodynamic blockage and pressure loss. The proximal cross-section 158 is part of the generally circular top section 166, whereas the middle cross-section 154 and the distal cross-section 156 are part of the generally airfoil-shaped bottom section 168. As illustrated, the generally circular proximal cross-section 158 is held in place within the generally circular mounting hole 160 in the outer upstream wall section 68 of the outer wall 66.

However, the generally airfoil-shaped middle cross-section 154 and the generally airfoil-shaped distal cross-section 156 are not directly held in place within the generally circular mounting holes 162, 164 in the outer interior wall 82 and the inner interior wall 84, respectively. Rather, each of the mounting holes 162, 164 in the outer and inner interior walls 82, 84 include sliding ring seals, which hold the middle cross-section 154 and the distal cross-section 156 of the premixed injector vane 64 in place. More specifically, an outer sliding ring seal 170 has an airfoil-shaped cutaway profile, within which the airfoil-shaped middle cross-section 154 of the premixed injector vane 64 is configured to fit. In addition, an inner sliding ring seal 172 has an airfoil-shaped cutaway profile, within which the airfoil-shaped distal cross-section 156 of the premixed injector vane 64 is configured to fit. The outer sliding ring seal 170 is located within the mounting hole 162 in the outer interior wall 82, whereas the inner sliding ring seal 172 is located within the mounting hole 164 in the inner interior wall 84.

As such, the premixed injector vane 64 may be secured in place within the mounting holes 160, 162, 164. In general, the premixed injector vane 64 may be slid into place into the converging-diverging annular duct 50 through the mounting hole 160 in the outer upstream wall section 68 of the outer wall 66. In addition, because the generally circular top section 166 of the premixed injector vane 64 is larger than the generally airfoil-shaped bottom section 168 of the premixed injector vane 64, the generally circular top section 166 of the premixed injector vane 64 may prevent the premixed injector vane 64 from sliding any further into the converging-diverging annular duct 50 once in place.

The sliding ring seals 170, 172 allow differential thermal movement between the fuel and air-cooled premixed injector vane 64 and the reheat duct carrying hot (e.g., 1700 to 2000° F. and above) exhaust products from the upstream turbine section. Without the sliding ring seals 170, 172, the compressor discharge air may otherwise leak around the premixed injector vane 64 in an uncontrolled fashion. Lean premixed, dry, low-emissions combustion systems, whether single stage or multi-stage, benefit from careful control of all air flows into the combustor, including leakage through seals such as the sliding ring seals 170, 172. Consequently, the sliding ring seals 170, 172 contribute greatly to the effectiveness of the premixed injector vanes 64.

FIG. 9 is a perspective view of an exemplary embodiment of the premixed injector vane 64. As illustrated, the premixed injector vane 64 includes a fuel injector port 174 near the proximal cross-section 158 of the premixed injector vane 64. Fuel 14 received through the fuel injector port 174 may be premixed with air within the premixed injector vane 64. In particular, the premixed injector vane 64 also includes an air hole 176 in the top section 166 of the premixed injector vane 64. Air in the outer upstream air enclosure 52 flows into the air hole 176 of the premixed injector vane 64 and premixes with the fuel 14 received through the fuel injector port 174. Once the air and fuel are premixed, the air-fuel mixture is injected into the stream of exhaust gases 46 in the upstream reheat combustion chamber 60 via a plurality of injection holes 178 in opposite lateral sides of the bottom section 168 of the premixed injector vane 64. Although illustrated as having seven injection holes 178 for each lateral side, the premixed injector vane 64 may include any number of injection holes 178. For example, the premixed injector vane 64 may include 3, 4, 5, 6, 7, 8, 9, 10, 11, 12, or even more injection holes 178 on each side of the premixed injector vane 64.

FIG. 10 is a cutaway side view of an exemplary embodiment of the premixed injector vane 64, illustrating the flow of air and fuel through the premixed injector vane 64. As illustrated, air from the outer upstream air enclosure 52 flows through the air hole 176 in the top section 166 of premixed injector vane 64, as illustrated by arrow 180. As such, the air from the outer upstream air enclosure 52 fills a trailing edge interior volume 182 of the bottom section 168 of the premixed injector vane 64, as illustrated by arrow 184. As described above, air from the inner upstream air enclosure 54 also flows through the premixed injector vane 64. In particular, as illustrated by arrow 186, air from the inner upstream air enclosure 54 flows through the distal cross-section 156 of the premixed injector vane 64 into a leading edge interior volume 188 of the bottom section 168 of the premixed injector vane 64. In addition, fuel 14 received through the fuel injector port 174 flows through a central interior volume 190 that extends through both the top and bottom section 166, 168 of the premixed injector vane 64, as illustrated by arrow 192.

FIGS. 11 and 12 are a cross-sectional view and a perspective view of an exemplary embodiment of the bottom section 168 of the premixed injector vane 64, illustrating the flow of air and fuel through the bottom section 168 of the premixed injector vane 64. As illustrated, the leading edge interior volume 188 is a generally annular-shaped volume (e.g., c-shaped volume) extending from opposite lateral sides 194, 196 of the bottom section 168 of the premixed injector vane 64. In particular, an outer circumference of the leading edge interior volume 188 is defined by a leading edge 198 of the bottom section 168 of the premixed injector vane 64. In addition, an interior wall 200 that defines the central interior volume 190, through which the fuel flows, defines an inner circumference of the leading edge interior volume 188. The trailing edge interior volume 182 is a generally triangular-shaped volume extending from the opposite lateral sides 194, 196 to a trailing edge 202 of the bottom section 168 of the premixed injector vane 64.

The area of the bottom section 168 of the premixed injector vane 64 between the lateral sides 194, 196, the leading edge interior volume 188, the trailing edge interior volume 182, and the central interior volume 190 are premixing zones 204, 206, within which the air and fuel are premixed before being injected into the stream of exhaust gases 46 in the upstream reheat combustion chamber 60 via the plurality of injection holes 178. In particular, as illustrated by arrows 208 and 210, fuel from within the central interior volume 190 flows into the premixing zones 204, 206 through holes 212, 214 in the interior wall 200 that defines the central interior volume 190. In addition, as illustrated by arrows 216 and 218, air from within the leading edge interior volume 188 flows into the premixing zones 204, 206 through holes 220, 222 in walls 224, 226 that extend from the interior wall 200 to the opposite lateral sides 194, 196 of the bottom section 168 of the premixed injector vane 64. Similarly, as illustrated by arrows 228 and 230, air from within the trailing edge interior volume 182 flows into the premixing zones 204, 206 through holes 232, 234 in walls 236, 238 that extend from the interior wall 200 to the opposite lateral sides 194, 196 of the bottom section 168 of the premixed injector vane 64. Once the air and fuel are premixed in the premixing zones 204, 206, the air-fuel mixture is injected into the stream of exhaust gases 46 in the upstream reheat combustion chamber 60 via the plurality of injection holes 178.

FIG. 11 illustrates any one of the fuel injector ports in the premixed injector vanes 64, and illustrates how the compressor discharge air and fuel gas streams interact before being injected into the exhaust gases 46. This premixing maintains lower reaction (flame) temperatures and lower NOx emissions, and also delays the reaction of the fuel and air until the air-fuel mixture has exited the premixed injector vane 64 and moved downstream. This is beneficial because the exhaust gases 46 may be 500° F. or more above the auto-ignition temperature for methane. Considering both emissions reduction and durability, the flame will generally not attach to the premixed injector vane 64. Rather, the reaction zone will generally be confined to the downstream annular space of the downstream reheat combustion chamber 62.

The embodiments described herein provide for fully annular (e.g., as opposed to can-annular, or mixing systems with multiple discrete mixing ducts) reheating of exhaust gases 46 from the first turbine section 40 of the gas turbine system 10 through the annular reheat combustion system 12 and the premixed injector vanes 64. Due at least in part to the fully annular design and the lack of discrete mixing ducts, there is much less cooled surface area to produce and protect in the disclosed embodiments. This is an advantage with respect to efficiency, simplicity, reduced cost, and flashback/flameholding. The premixed injector vanes 64 enable premixing of the air-fuel mixture before injecting the air-fuel mixture directly into the stream of exhaust gases 46 from the first turbine section 40. In particular, the premixed injector vanes 64 are held in place by the interior walls 82, 84 of the annular reheat combustion system 12. Due to the premixing in the premixed injector vanes 64, no vortex generators are required in conjunction with the embodiments disclosed herein, as opposed to conventional reheating techniques. In addition, because the premixed injector vanes 64 protrude across the entire stream of exhaust gases 46, more injection holes may be used. Furthermore, the radial duct pinch of the converging-diverging annular duct 50 (e.g., from the interior walls 82, 84) is preferred over the circular duct pinching of conventional reheat systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine system, comprising:
    a compressor configured to receive and compress a working fluid;
    a combustor configured to receive compressed working fluid from the compressor and fuel, wherein the combustor is configured to combust a mixture of the compressed working fluid and the fuel to generate an exhaust gas; and
    a turbine having a first turbine section and a second turbine section, wherein the turbine is configured to receive the exhaust gas from the combustor and to utilize the exhaust gas to rotate a shaft, wherein an annular reheat combustion system is located between the first and second turbine sections, the annular reheat combustion system comprising a premixed injector vane, wherein the premixed injector vane comprises an air intake aperture configured to receive air, and wherein the premixed injector vane is configured to mix the air received via the air intake aperture and fuel to produce an air-fuel mixture, wherein the premixed injector vane is configured to inject the air-fuel mixture into the exhaust gas received from the first turbine section, wherein the annular reheat combustion system comprises an annular duct having an inner annular wall, an outer annular wall, and first and second interior walls between the inner annular wall and the outer annular wall, and wherein the premixed injector vane is held in place by the outer annular wall and the first and second interior walls of the annular duct.

2. The system of claim 1, wherein the first interior wall comprises a first diverging wall section and a first converging wall section coupled to the first diverging wall section, and wherein the second interior wall comprises a second diverging wall section and a second converging wall section coupled to the second diverging wall section, and wherein the first converging wall section and the second converging wall section converge toward one another, and wherein the first diverging wall section and the second diverging wall section diverge away from one another.

3. The system of claim 1, wherein the premixed injector vane comprises a circular section and an airfoil-shaped section.

4. The system of claim 3, wherein the circular section of the premixed injector vane comprises the air intake aperture, and wherein the air intake aperture is configured to receive the air from an outer air enclosure between the outer annular wall and the first interior wall of the annular duct.

5. The system of claim 3, wherein the airfoil-shaped section of the premixed injector vane comprises the air intake aperture, and wherein the air intake aperture is configured to receive the air from an inner air enclosure between the inner annular wall and the second interior wall of the annular duct.

6. The system of claim 3, wherein the premixed injector vane comprises a first plurality of injection holes on a first lateral side of the airfoil-shaped section of the premixed injector vane, and a second plurality of injection holes on a second lateral side of the airfoil-shaped section of the premixed injector vane opposite to the first lateral side of the premixed injector vane; wherein the first and second plurality of injection holes are configured to inject the air-fuel mixture into the exhaust gas received from the first turbine section.

7. A system, comprising:
    an annular reheat combustion system configured to mount between first and second turbine sections of a gas turbine system, the annular reheat combustion system comprising:
        an annular duct having an inner annular wall, an outer annular wall, and first and second interior walls between the inner annular wall and the outer annular wall; and
        a premixed injector vane comprising an air intake aperture configured to receive air, wherein the premixed injector vane is configured to mix the air received via the air intake aperture and fuel to produce an air-fuel mixture, wherein the premixed injector vane is configured to inject the air-fuel mixture into a stream of exhaust gases from the first turbine section, and wherein the premixed injector vane is held in place by the outer annular wall and the first and second interior walls of the annular duct.

8. The system of claim 7, wherein the annular duct comprises a first mounting hole in the first interior wall, a second mounting hole in the second interior wall, a third mounting hole in the outer annular wall, a first sliding ring seal in the first mounting hole, and a second sliding ring seal in the second mounting hole, wherein the premixed injector vane is held in place by the first sliding ring seal in the first mounting hole, the second sliding ring seal in the second mounting hole, and the third mounting hole.

9. The system of claim 7, wherein the premixed injector vane comprises a circular section and an airfoil-shaped section.

10. The system of claim 9, wherein the circular section of the premixed injector vane comprises the air intake aperture, and wherein the air intake aperture is configured to receive the air from an outer air enclosure between the outer annular wall and the first interior wall of the annular duct.

11. The system of claim 10, wherein the airfoil-shaped section of the premixed injector vane comprises a generally triangular-shaped interior volume configured to receive the air from the outer air enclosure, wherein the interior volume is located toward a trailing edge side of the airfoil-shaped section of the premixed injector vane.

12. The system of claim 9, wherein the airfoil-shaped section of the premixed injector vane comprises the air intake aperture, and wherein the air intake aperture is configured to receive the air from an inner air enclosure between the inner annular wall and the second interior wall of the annular duct.

13. The system of claim 12, wherein the airfoil-shaped section of the premixed injector vane comprises an interior volume configured to receive the air from the inner air enclosure, wherein the interior volume is located toward a leading edge side of the airfoil-shaped section of the premixed injector vane.

14. The system of claim 9, wherein the circular section of the premixed injector vane comprises a fuel intake port configured to receive fuel.

15. The system of claim 14, wherein the premixed injector vane comprises a circular interior volume configured to receive the fuel, wherein the circular interior volume is located between a first interior air volume on a leading edge side of the premixed injector vane and a second interior air volume on a trailing edge side of the premixed injector vane.

16. The system of claim 9, wherein the premixed injector vane comprises a first plurality of injection holes on a first lateral side of the airfoil-shaped section of the premixed injector vane, and a second plurality of injection holes on a second lateral side of the airfoil-shaped section of the premixed injector vane opposite to the first lateral side of the premixed injector vane; wherein the first and second plurality of injection holes are configured to inject the air-fuel mixture into the exhaust gases received from the first turbine section.

17. A system, comprising:
an annular duct having an inner annular wall, an outer annular wall, and first and second interior walls between the inner annular wall and the outer annular wall, wherein the first interior wall comprises a first diverging wall section and a first converging wall section coupled to the first diverging wall section, and wherein the second interior wall comprises a second diverging wall section and a second converging wall section coupled to the second diverging wall section, and wherein the first converging wall section and the second converging wall section converge toward one another, and wherein the first diverging wall section and the second diverging wall section diverge away from one another; and
a plurality of injector vanes configured to mix air and fuel to produce an air-fuel mixture, wherein the plurality of injector vanes are configured to inject the air-fuel mixture into a central chamber between the inner and outer annular walls, and wherein the plurality of injector vanes are held in place by the outer annular wall and the first and second interior walls of the annular duct.

18. The system of claim 17, wherein the plurality of injector vanes each comprise a circular section and an airfoil-shaped section.

19. The system of claim 18, wherein the circular section of each injector vane comprises an air intake aperture configured to receive air from an outer air enclosure between the outer annular wall and the first interior wall of the annular duct.

20. The system of claim 18, wherein the airfoil-shaped section of each injector vane comprises an air intake aperture configured to receive air from an inner air enclosure between the inner annular wall and the second interior wall of the annular duct.

21. The system of claim 18, wherein each injector vane comprises a first plurality of injection holes on a first lateral side of the airfoil-shaped section of the injector vane, and a second plurality of injection holes on a second lateral side of the airfoil-shaped section of the injector vane opposite to the first lateral side of the injector vane.

* * * * *